United States Patent [19]

Ault et al.

[11] Patent Number: 4,731,880
[45] Date of Patent: Mar. 15, 1988

[54] COMMUNICATION NETWORK
[75] Inventors: Cyrus F. Ault; Clinton D. Gibler, both or Wheaton, Ill.
[73] Assignee: American Telephone and Telegraph Company, AT&T Bell Laboratories, Murray Hill, N.J.
[21] Appl. No.: 902,102
[22] Filed: Aug. 28, 1986

Related U.S. Application Data

[63] Continuation of Ser. No. 494,101, May 12, 1983, abandoned.
[51] Int. Cl.$^4$ .............................................. H04B 9/00
[52] U.S. Cl. ...................................... 455/607; 370/94; 455/69; 455/612
[58] Field of Search .................... 370/4, 60, 85, 89, 17, 370/87, 44; 340/825.5; 455/52, 69, 70, 67, 601, 606, 607, 612

[56] References Cited

U.S. PATENT DOCUMENTS

| Re. 31,319 | 7/1983 | Fraser | 370/80 |
|---|---|---|---|
| 3,732,496 | 5/1973 | Boyer | 455/69 |
| 3,747,845 | 7/1973 | Fraser | 179/15 |
| 3,925,782 | 12/1975 | Anderl et al. | 455/69 |
| 4,107,260 | 8/1978 | McMahon | 455/601 |
| 4,107,518 | 8/1978 | McMatton | 455/612 |
| 4,227,260 | 10/1980 | Vojvodich et al. | 455/601 |
| 4,347,498 | 8/1982 | Lee et al. | 340/825.02 |
| 4,366,565 | 12/1982 | Herskowitz | 370/1 |
| 4,380,063 | 4/1983 | Janson et al. | 370/60 |
| 4,470,154 | 9/1984 | Yano | 455/612 |
| 4,481,626 | 11/1984 | Boggs et al. | 370/94 |
| 4,531,238 | 1/1985 | Rawson et al. | 455/607 |

FOREIGN PATENT DOCUMENTS 56-87948 10/1981 Japan.
57-190436 2/1983 Japan.

OTHER PUBLICATIONS

Buy—"A Reliable Token-Ring System".
Baues, P., "Local Area Networks Based on Fiber-Optic Communication Technology", *Siemens Forschungs und Entwicklungsberichte*, vol. 12, No. 1, Feb. 1983, (Berlin, DE), pp. 3–10.
A. G. Fraser, "DATAKIT-A Modular Network for Synchronous and Asynchronous Traffic," *ICC '79 Conference Record* (International Conference on Communications, Boston), vol. 2, Jun. 10–14, 1979, pp. 20.1.1–20.1.3.
G. L. Chesson, "DATAKIT Software Architecture," *ICC '79* (International Conference on Communications, Boston), vol. 2, Jun. 10–14, 1979, pp. 20.2.1–20.2.5.
G. L. Chesson et al., "DATAKIT Network Architecture," *COMPCON '80*, Twentieth Feb. 25–28, 1980, pp. 59–61.
Siemens Forschungs-und Entwicklungsberichte vol. 12, No. 1, Feb. 16, 1983 (Berlin, DE) P. Baues: "Local Area Networks Based on Fiber-Optic Communication Technology", pp. 3–10.
Compcon 82 Fall, Sep. 20–23, 1982, H. Tominaga et al.: a Network Architecture with Distributed Switching Function for Optical Fiber Links", pp. 478–483.
"Fibernet: Multimode Optical Fibers for Local Computer Networks", IEEE Transactions on Communications, vol. Com 26, No. 7, Jul. 1978, Eric G. Rawson and Robert M. Metcalfe, pp. 983–990.
"The Impact of Fiber Optics on Local Area Networks", Telephony, Jan. 3, 1983, D. Jay Cunningham, pp. 28–33.
"Optical-Fibre Systems for Telecommunications", GEC Journal of Science & Technology, vol. 46, No. 2, 1980, P. Wells, pp. 51–60.
"Star Repeaters for Fiber Optic Links", Applied Optics, vol. 16, No. 2, Feb. 1977, D. H. Mc Mahon and R. L. Gravel, pp. 501–503.

*Primary Examiner*—Joseph A. Orsino, Jr.
*Attorney, Agent, or Firm*—Werner Ulrich

[57] ABSTRACT

A high-speed fiber optic star configuration network uses a processor at the network hub to monitor and control network activity. The hub and the individual nodes of the network cooperate to calibrate node transmitter power levels and node receiver sensitivities. A token passing protocol is used to allocate network access. The token passing is monitored at the hub to detect lost tokens or a babbling bus. The hub processor has the capability to initiate tokens or restore lost tokens and to shut off the transmitter of a node which remains connected to the bus for an excessive period of time. In one embodiment, the circuit elements of the hub are duplicated to provide two separate paths through the hub.

31 Claims, 10 Drawing Figures

SYSTEM CALIBRATION
INTERFACE PROCESSOR

FIG. 7

CALIBRATION
SIGNALS

FIG. 8

NETWORK
INTERFACE

FIG. 9

FIG. 10
NETWORK MONITORING

COMMUNICATION NETWORK

CROSS-REFERENCE TO RELATED APPLICATION

This application is a continuation of application Ser. No. 494,101, filed May 12, 1983, now abandoned.

TECHNICAL FIELD

The invention relates to networks for interconnecting data handling stations and, in particular, to an arrangement and method for controlling such networks.

Large computer systems may consist of several data handling stations such as a number of independently operating computers and input/output terminals, at various locations in a building or building complex. So-called "local area networks" are commonly used to exchange information among these stations, which are referred to as nodes of the networks. Local area networks may take on a variety of forms. One known form is the "star" configuration network wherein all the associated stations are connected to a hub through which flow all communications in the network.

Typically, in local area communication networks, access control does not reside in any single node but is distributed among the nodes of the network. In one known scheme, access to the network is allocated by means of a "token passing" protocol. In this scheme, an access sequence is assigned to the nodes and each node sends a control code or "token" to the next node in sequence upon completion of its access to the network giving the next node an opportunity to use the network. If access is not required by that node, it will pass the token onto the next, and so on in succession. In such a scheme, serious problems occur when a token is "dropped", that is, it is not properly transmitted or not properly received due to a malfunction at one of the nodes. It is always difficult to determine when and where a token is dropped and, consequently, the network cannot be used by any of the nodes until a diagnosis is made and corrective action is taken. Another problem in local networks is the "babbling bus". This typically occurs when a node, due to a malfunction, continues to transmit and fails to relinquish access to the network. Not only is it difficult to identify the faulty node, it is also impossible to reach any of the nodes by means of the network, as long as the faulty node continues to transmit. Thus, system action such as intervention by maintenance personnel is usually required.

When optical fibers are employed as the interconnecting transmission medium in star configuration networks, the several nodes each have an optical transmitter and an optical receiver, and the hub may simply consist of an optical coupler which transmits light from a plurality of incoming lines to a plurality of outgoing lines. Other prior art optical networks employ an "active" hub which converts from optical to electrical signals, amplifies the electrical signals and converts back to optical. A disadvantage of the star network is the potential for failure of the entire network due to a malfunction at the hub. One of the problems of optical networks is that due to inherent differences in the characteristics of optical transmitter devices and the conducting fibers, the strength or level of the signals from different nodes may vary substantially. Level adjusting amplifiers using automatic gain control are commonly employed in the signal receiving circuitry to compensate for such variations. To set the amplifiers to the appropriate level, however, requires that a preamble consisting of a series of calibration pulses be transmitted before each message transmission. This action is burdensome and uses valuable network access time.

SUMMARY OF THE INVENTION

In accordance with this invention, the hub of a network for interconnecting a plurality of data handling stations includes control circuitry for monitoring the transfer signals through the hub and for generating signals, which may be in the form of control signals or data, to be transmitted to the stations. Preferably, the hub further includes circuitry for inhibiting the flow of data through the hub, whereby the hub can transmit signals to the stations via the network without interference from other signals which may be transmitted on the network. In one embodiment of the invention, the controller monitors the network for error conditions and responds to a detected error condition to inhibit transmission through the hub and to transmit control signals which may be used to disable a station causing the error condition. Furthermore, the controller is adapted to detect absence of transmittal of control tokens for a predetermined period of time to inhibit the transfer of data through the hub. The controller may also be adapted to record the identity of the station having control of the network and send a station disable signal to a station which does not relinquish control. Furthermore, the sequence in which data handling stations are to receive control tokens may be recorded in the controller and it may transmit a token to the next appropriate station.

In one embodiment of the invention, the network hub is connected to interface circuits, each connectable to a data handling station and each interface circuit includes a receiver and a transmitter and is responsive to control signals transmitted from the hub to inhibit the further transmission of data over the network. Each interface circuit is equipped with a register which stores a unique disable code and a matcher circuit which compares received signals with the disable code to generate an output signal which inhibits operation of the transmitter when received signals match the disable code. Advantageously, a counter is provided which allows the transmission to be inhibited only after a predetermined number of disable codes have been received, thereby preventing inhibit action by random data equaling the disable code.

In a further embodiment, the hub is connected to a plurality of interface circuits by means of optical fiber conductors and each interface circuit has an optical transmitter responsive to level control signals to generate output signals at differing power levels. A calibration code is transmitted by the interface circuit to set its transmitter at a desired level. A control word setting the transmitter at a level sufficiently high to assure transmission of the signal through the network is applied to the optical transmitter and a counter is used to periodically reduce the value of the control word to reduce the output level of the transmitter by predetermined increments. Preferably, the hub includes an adjustable threshold detector which is set to a relatively high threshold prior to calibration. When the decremented calibration signals are no longer of sufficient strengths to be detected by the threshold detector the hub will not repeat the signal to the nodes. The lack of a received signal at the interface circuit will cause the calibration to be terminated. Upon completion of calibration, the threshold detector may be adjusted to a lower value to assure detection of signals of the calibrated power level. Alternatively, if an adjustable threshold detector is not used, the value of the counter may be incremented, upon completion of calibration, to a value equivalent to the value of the last calibration signal detected.

Advantageously, in accordance with this invention, the level of transmission of each of the optical transmitters of the interface circuits may be set to provide approximately the same power level at the hub receiver. Preferably, the interface circuits will be equipped with receive amplifiers with automatic gain control and the hub will transmit a calibration signal to all interface circuits prior to the setting of the power levels of the transmitters. The calibration signal will be applied for a period of time sufficient to cause the receive amplifiers to adjust to approximately the same signal receive level. It is an advantage of the networks of this invention that the interface circuit receivers need not be readjusted by means of a preamble code each time a node gains access to the network, as in prior art systems.

In one embodiment of the invention, the reliability of the hub is enhanced by duplication of the signal transfer component of the hub and the hub processor. A sanity mechanism is used to switch from the active to the stand-by processor in the event of malfunction of the active processor.

Advantageously, a network in accordance with this invention, comprises an intelligent hub which is able to provide access to the network even in the presence of a faulty node which would otherwise disable the network. More particularly, the network comprises means for identifying a malfunctioning node which is the source of a babbling bus and for inhibiting the malfunctioning nodes from accessing the bus. The embodiment further comprises means for detecting the loss of a token and for initiating a token to the appropriate node in the network. Furthermore, the intelligent hub may be used advantageously to monitor the activity of each of the nodes on the network over a period of time and provide indications of the load of the network which aids in the design and engineering of local network systems. In one embodiment of the invention, the hub processor is provided with an input terminal and mass storage memory, for example, a disc store. Advantageously, the input terminal provides access to the network from the hub and the mass memory provides central storage for common data which may be accessed by each of the nodes without affecting the operation of any other node.

BRIEF DESCRIPTION OF THE DRAWING

The invention may be better understood from the following detailed description when read with reference to the drawing in which.

DETAILED DESCRIPTION

General

Figure 1:
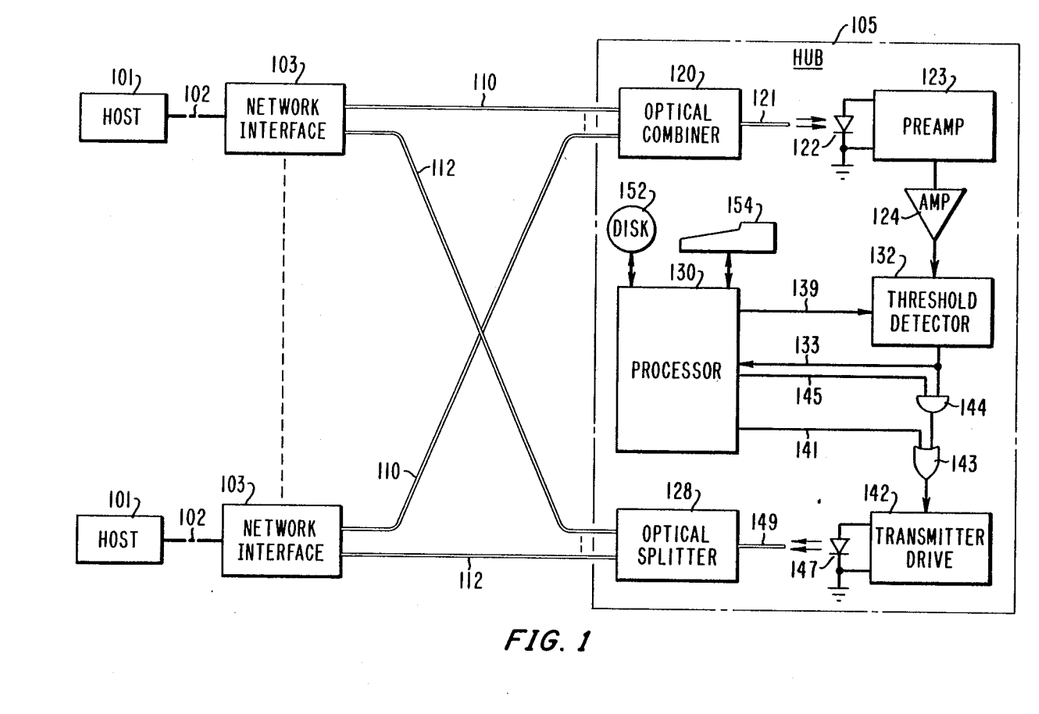
FIG. 1 is a block diagram representation of a star configuration network in accordance with the invention.

FIG. 1 is a representation of an active star local area network used to illustrate the principles of the invention. The network interconnects a plurality of data handling stations such as host processors 101 which, for example, may be any of a number of well-known microprocessors, intelligent terminals, or the like. Each of the hosts is connected through a network interface circuit 103 to a network hub 105 by means of a fiber optic transmit link 110 and a fiber optic receive link 112. In the star configuration network, all transmissions between host processors pass through the hub 105. The hub is of a type referred to as "active" in which optical transmission is converted to electrical signals and amplified before being converted back to optical and transmitted on an outgoing link.

The hub 105 comprises a receiver in the form of an optical combiner 120 which provides the logical OR of the optical signals applied on the links 110. In a network configuration of this type, only one of the host processors will be transmitting signals on the links 110 and the optical output of the optical combiner 120 will simply represent the optical signals received from the active host. Signals received at the hub receiver are transferred to the hub transmitter, optical splitter 128, via a signal transfer circuit comprising optical detector 122, preamplifier 123, amplifier 124, threshold detector 132, AND gate 144, OR gate 143, transmitter drive circuit 145, and an optical source device 147. The resultant signal of the optical combiner 120 is applied via optical conductor 121 to optical detector 122 which applies a corresponding electrical signal to preamplifier 123 and amplifier 124. The preamplifier 123 and amplifier 124 amplify the received signal and transmit it to transmitter driver circuit 142 and light-emitting source 147. The optical output of source 147 is applied via optical conductor 149 to optical splitter 128 which applies the optical signal to all of the optical links 112. The optical combiner 120, the optical splitter 128, the optical detector 122, the optical source 147 and the preamplifier 123, amplifier 124 and driver circuit 142 are well-known devices which are commercially available.

The hub 105 is further provided with a processor 130 and a threshold detector 132. This processor, may, for example, be a well-known microcomputer, such as the Intel 8086 microcomputer sold by the Intel Corporation. Detector 132 is a commercially available electrical threshold detection circuit which responds to a signal provided by the amplifier 124 to generate an output signal only when the amplifier output signal exceeds a predetermined level. The level of the threshold detector 132 is externally controllable, and may be controlled from the processor 130 by control signals applied via conductor 139. Cooperation between the processor and the detector allows the hub to reject signals falling below desired levels.

The processor 130 monitors the data passing through the hub 105 by monitoring the output of threshold detector 132 via conductor 133. The processor 130, in conjunction with AND gate 144 controls the data flow through the hub. By means of an enable signal on conductor 145, the processor controls the gate and selectively allows or inhibits the flow of data. Furthermore, the processor 130 has access to the network via OR gate 143. By means of conductor 141 and OR gate 143, the processor 130 can transmit data and control signals to the network interface circuits 103 and the host computers 101.

Peripheral equipment for processor 130 includes a standard input/output terminal 154 and a disc store 152. The terminal 154 is used to provide maintenance access to the processor 130 allowing the processor's memory to be interrogated. Further, the terminal is used to send messages via processor 130 to the network interface circuits 103 or the host computers 101. The disc store 152 provides a mass storage device accessible to all of the host computers. The processor 130 has an identification similar to the identifications assigned to the hosts and each of the hosts can access a network common data base or other files stored in disc store 152 by communication with processor 130 over the network.

Figure 2:
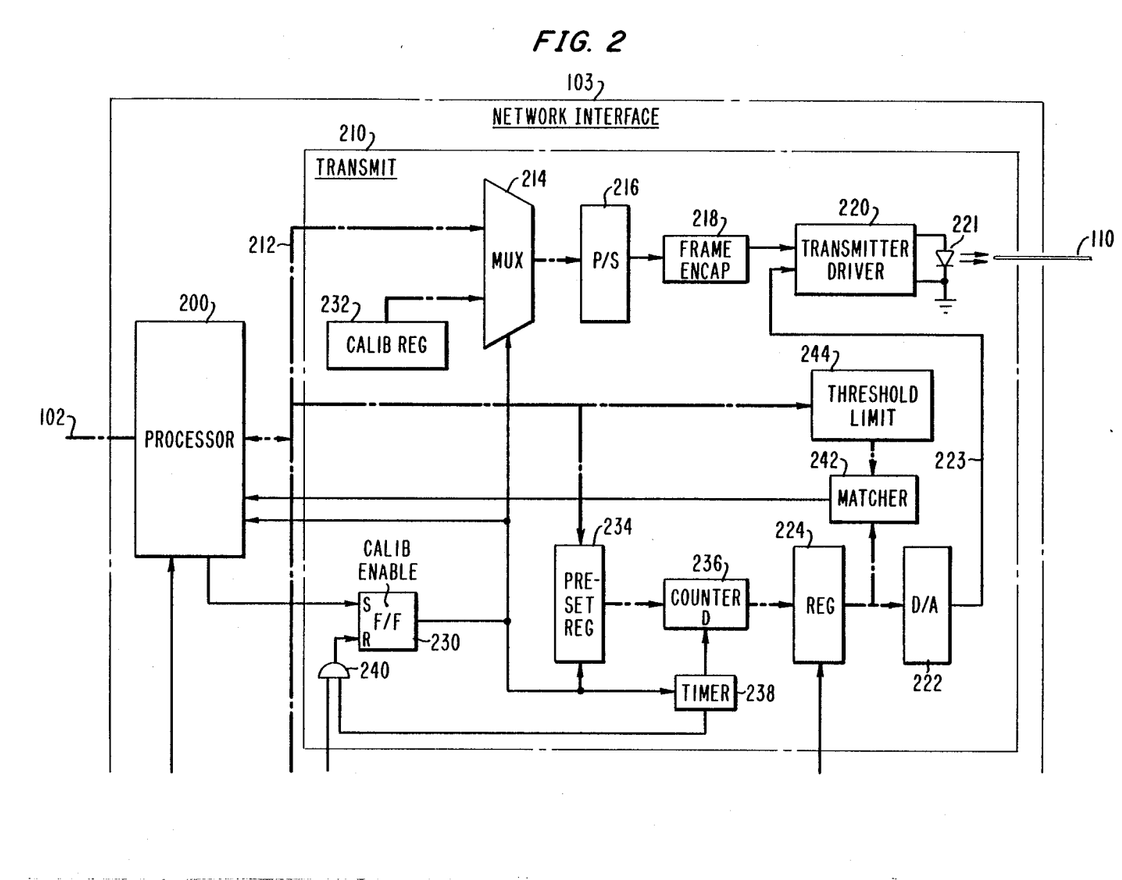
FIGS. 2 and 3 form a more detailed representation of the network interface circuit of FIG. 1.
Figure 3:
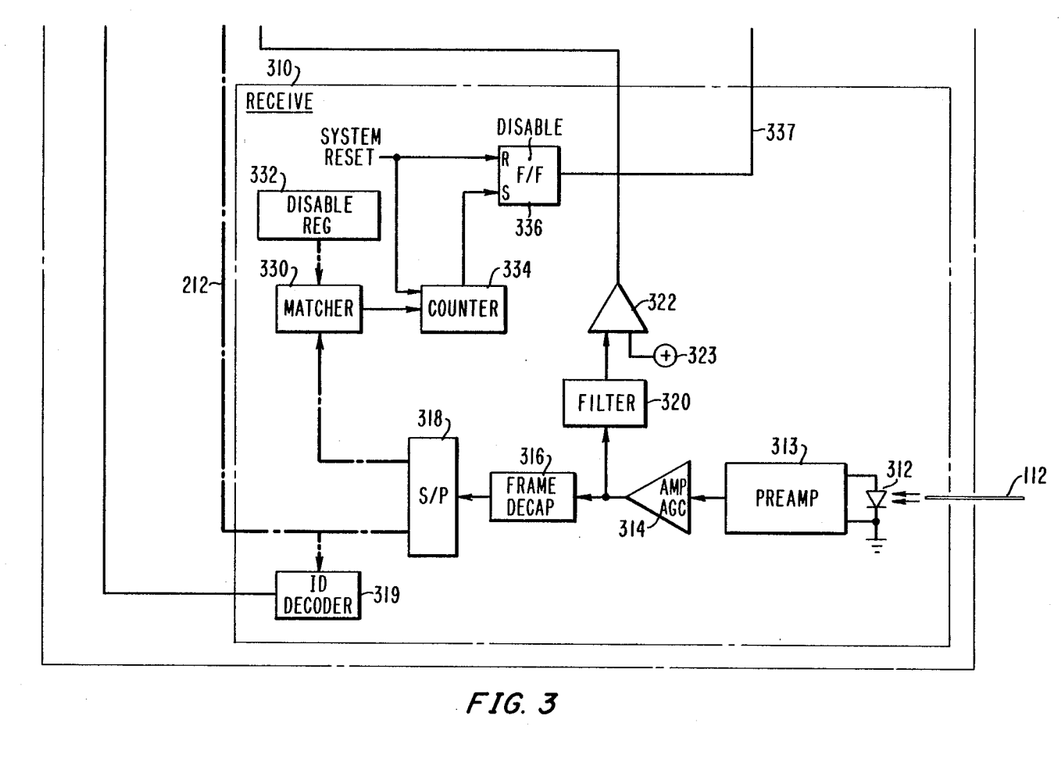

FIGS. 2 and 3 show in greater detail the circuitry of the network interface circuits 103. The network interface circuits of this illustrative system are assumed to be identical, each comprising a microprocessor 200, a transmit circuit 210 and a receive circuit 310. The microprocessor 200 may be any of a number of well-known microprocessors, such as, for example, the Intel model 8086 microprocessor. The processor 200 may be connected to the host processor 101 by means of a bus 102. The interconnection and communication between the host processor 101 and processor 200 will not be described in detail herein, since these are well known in the art. These processors may communicate in a known manner, such as, by means of a shared memory. Data from the host processor to be transmitted on the network, will be sent to the processor 200 and will be transmitted via bus 212 as a parallel data word to the transmit circuit 210. A multiplexer 214 in the transmit circuit transmits the data word via a parallel-to-serial converter 216 to a frame encapsulation circuit 218 which assembles the data into a packet.

Figures 4, 5:
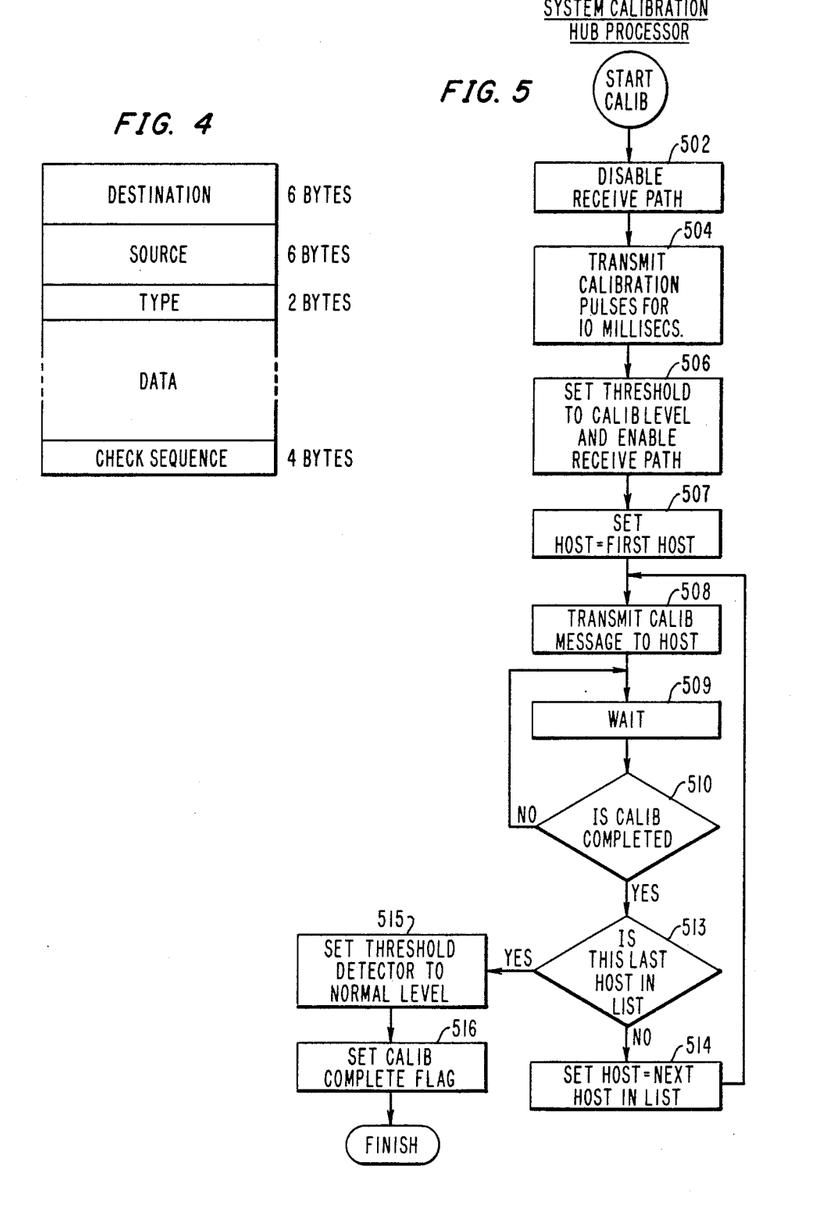
FIG. 4 is a representation of a data packet structure.
FIG. 5 is a flowchart representation of calibration functions performed by the hub processor of FIG. 1.

A typical packet format commonly used in data communications is shown in FIG. 4. The packet usually includes a destination identification, a source identification, a packet type identification, data, and an error check sequence. The circuitry for performing the packet encapsulation function is well known in the art and need not be described further herein. Packets are transmitted serially from the frame encapsulation circuit 218 via the transmitter drive circuit 220 and optical source device 221 onto optical link 110, which is connected to the hub 105. The drive circuit 220 is a standard controllable amplifier circuit with a bias control connected to a digital-to-analog converter 222 via conductor 223. The digital-to-analog converter 222 receives a digital input control word from register 224 which defines the transmit power level of the optical signal generated at the optical source 221.

FIG. 3 shows the receive circuit 310. Serial data packets destined for the host processor are received from the hub 105 on optical link 112, converted to parallel data words and transmitted to processor 200 for transfer to the host processor. Optical signals received via link 112 are transformed into electrical signals by optical detector 312. Preamplifier 313 and amplifier circuit 314, amplify the received signals to a desired level. The serial stream of data signals is transmitted to a frame decapsulation circuit 316 which disassembles the received data packets. These circuits are well known in the art and need not be described in detail. The frame decapsulation circuit transmits the serial stream of data to a serial-to-parallel converter 318 for transmission to processor 200 in the form of parallel data words via bus 212.

The receive circuit 310 further comprises ID decoder circuit 319 which decodes data words transmitted on bus 212 and serves to alert processor 200 of the receipt of a packet header which defines the identity of the host 101. Decoders such as this are well known and further description of this circuit is not necessary for an understanding or use of the invention.

Calibration

The hub processor 130 is used in cooperation with the network interface processors 200 to calibrate the transmitters and receivers in the several network interface circuits 103. In optical systems, the power level of the signal transmitted by different optical sources tends to vary substantially. For this reason, amplifier 314 is provided with automatic gain control which will automatically adjust to a level compatible with an incoming signal. Typically, the automatic gain control reacts comparatively slowly to avoid frequent readjustments of the level which could render the output meaningless. Such amplifier circuits are well known and commercially available. The controllable transmitter drive circuit 220 can be calibrated to produce an output signal which yields an optical signal of desired level at optical source device 221. In this illustrative system, all of the network interface receivers are first calibrated to a standard level under control of the hub processor 130. Thereafter, the optical signal transmit level of each of the network interface circuits is calibrated under control of the hub processor 130 and the interface processors 200.

Figure 6:
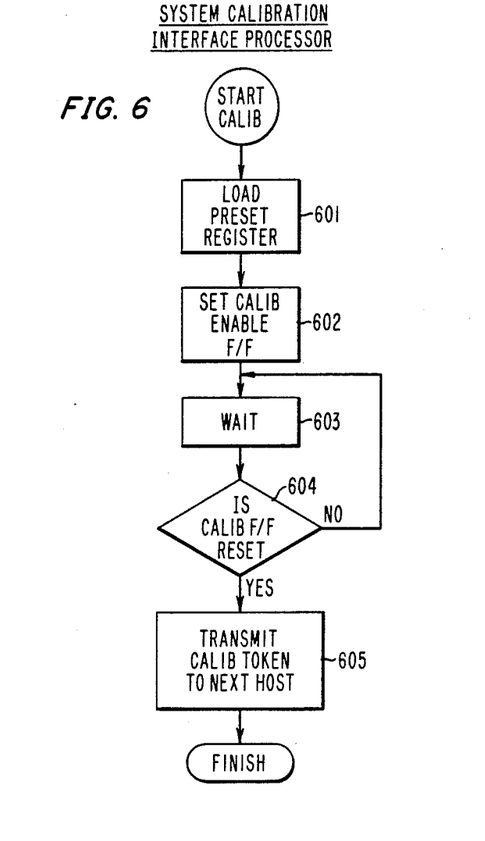
FIG. 6 is a flowchart representation of calibration functions performed by the interface processor of FIG. 2.

FIGS. 5 and 6 are flowchart representations of the functions performed by hub processor 130 and interface processor 200, respectively. The processor 130 may be started in its calibration mode by a system initialization message from terminal 154 or a cyclical process executed on processor 130. To avoid interference from any unknown source during receiver calibration, the processor 130 disables the hub's receive path by disabling AND gate 144. This action is indicated in FIG. 5 in block 502. As indicated in block 504, the processor 130 transmits calibration pulses for a specified period of time, for example, 10 milliseconds. A serial stream of calibration pulses of equal level for this period of time will ordinarily be sufficient to stabilize the automatic gain control circuits in the amplifiers 314. The calibration pulses are transmitted via OR gate 143 to transmit driver 142 and converted to optical signals by optical source 147. The optical signals are simultaneously transmitted to all of the network interface receive circuits 310 via the multiple output optical splitter 128 and optical conductors 112. The receiver calibration does not require action by interface processors 200.

After transmission of the receiver calibration pulses, the processor 130 begins the transmitter calibration procedure by adjusting the threshold of the controllable threshold detector 132 to a calibration level and by enabling AND gate 144 to open the data transfer path between the hub receiver and transmitter, as indicated in block 506. The threshold level of threshold detector 132 is adjustable and has a normal level for normal reception of signals. During this calibration phase, the threshold detector 132 will be used to calibrate transmitters of the network interface circuits 103 and the signal threshold is set at a level higher than the normal level, by control signals from hub processor 130 generated on conductor 139. This is done to assure that the calibration signals exceed the normal threshold by some minimum amount. The difference between the normal level and the calibration level may, for example, be on the order of three decibels.

Prior to initiating the calibration procedure, a list showing the identities of all of the connected hosts will be entered in hub processor 130 from terminal 154. The hub processor will initiate calibration of the interface transmitters of each of the listed hosts in sequence. As indicated in block 507, the processor designates an area in memory as HOST and enters the identity of the first listed host in the designated area. Thereafter, as indicated in block 508, the hub processor 130 transmits a calibration message to the designated host. The calibration message is a packet of the form outlined in FIG. 4, identifying the designated host interface and including data representing a message requesting the interface processor 200 to start calibration. The packet destination will be recognized by the ID decoder 319 in the network interface and the calibration message will cause the interface processor 200 to begin its calibration routine, which is outlined in flowchart form in FIG. 6. As will be discussed with respect to FIG. 6, the network interface processor 200 upon completion of calibration of the associated interface transmitter driver 220, will transmit a calibration completed message to the hub processor 130. After having initiated calibration for the interface of one of the hosts, the hub processor 130, as indicated in block 509, enters a wait state. While in this state, the processor monitors the output of the threshold detector 132 for the calibration completed message from the interface processor and sets a bit in memory when the message has been received. The hub processor periodically checks to determine whether the calibration completed message has been received, as indicated in block 510. If not, the processor 130 will return to the wait state. Otherwise, the identity of the host from which the message is received is compared to the identity of the last host in the list, as indicated in block 513. If this is not the last host, the processor will enter the identity of the next host in the list in the area in memory defining HOST, as shown in block 514. Thereafter, the calibration routine for the hub processor will be repeated until it is determined that the last host in the list has been serviced by means of the test of block 513.

After all of the interface transmitters connected to the hub have been calibrated, the calibration sequence is completed. In that case, processor 130 returns the threshold level of threshold detector 132 to its normal precalibration level, as indicated in block 515. Thereafter, processor 130 will set a calibration complete flag, as indicated in block 516, thereby indicating completion of the calibration sequence for the entire network.

As indicated earlier, FIG. 6 represents the calibration sequence carried out under the control of the interface processor 200 and which is started upon receipt of the calibration control message transmitted from hub processor 130. In response to that message, processor 200 loads the preset register 234 with a control word defining the initial signal transmission level for calibration and sets the calibrate-enable flip-flop 230, as indicated in blocks 601 and 602, respectively. Other calibration steps are executed autonomously by the circuitry of FIG. 2, including the resetting of the calibration-enable flip-flop 230 at the end of calibration. Therefore, processor 200 enters a wait state as indicated in block 603, after setting the calibration-enable flip-flop. The processor will periodically check this flip-flop, as indicated in block 604 and transmit a packet to hub processor 130, including the calibration completed message, when it finds the calibrate-enable flip-flop to be in the reset state. As discussed above with reference to FIG. 5, the receipt of this message causes hub processor 130 to complete calibration of all of the host interface transmitters connected to the hub.

Referring to FIG. 2, the setting of calibration-enable flip-flop 230 by interface processor 200 causes the output of calibration register 232 to be transmitted via multiplexer 214 through the transmit circuitry including the parallel-to-serial converter 216, the frame encapsulating circuit 218, and the transmitter driver 220. The calibrate register 232 is pre-loaded with data representing a calibration packet which may, for example, consist of only a few bytes of information. Since register 232 is directly connected to the transmit circuitry, the contents of this register will be continuously transmitted as long as the calibrate-enable flip-flop is set. The setting of the enable flip-flop also causes the contents of the preset register 234 to be transmitted to counter 236 and causes timer 238 to be activated. A periodic output signal from timer 238 causes the counter to transmit its contents which is in the form of a binary control word, to register 224 and causes the counter to be decremented. The contents of register 224 is applied to a digital-to-analog converter 222 which applies a control signal corresponding to the value of the binary control word to transmitter driver 220. This analog signal sets the level of the output signal of driver 220 and, hence, the level of the optical signal transmitted on conductor 110.

It will be apparent that the contents of preset register 234 control the amplitude of the signal as initially transmitted. This register is loaded by the processor 200 with a control word which will cause the transmitter 220 to generate a calibration signal of considerably greater magnitude than will be required for transmission through the network. The calibration signal will be transmitted through hub 105 if it is of sufficient amplitude to exceed the threshold level of the threshold detector 132, and will be received at the network interface on optical link 112. The signal will be passed through the preamplifier 313 and amplifier 314, shown in FIG. 3. A filter circuit 320, which may be a well-known R/C filter, is connected to amplifier 314 to filter the pulses generated by the amplifier and apply the resultant output signal to a comparator 322. The comparator 322 may be any analog comparator having one of its terminals connected to a source of potential 323 and adapted to generate an output signal when the filtered value falls below the value of the source. The value of the source may be chosen such that the filtered value is below that level only when no signal is received. When an output signal is generated by the comparator 322, it is used to reset the calibrate-enable flip-flop 230. The comparator output signal is applied to the flip-flop 230 via AND gate 240 which is enabled periodically by the timer 238.

Figure 7:
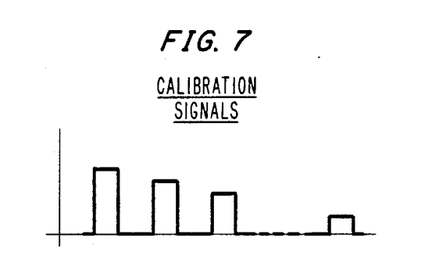
FIG. 7 is a representation of a series of calibration signals generated by the transmit circuit of FIG. 2.
Figure 8:
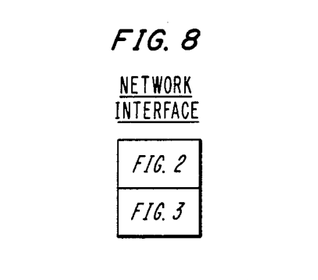
FIG. 8 is a key sheet showing the relative positions of other figures.

In the calibration sequence, the first series of signals transmitted by transmitter driver 220 is, as indicated earlier, of a value sufficiently large to assure receipt of the signal at the hub. The timer 238 will apply a second pulse to the counter 236 sometime after the time for receipt of the first signal, causing the contents of the counter to be entered in register 224 and causing the counter to be decremented. The new contents of register 224 is a lower value than the prior one and the resulting signal generated by the transmitter driver 220 will be of a lower level than the previous signal. In this manner, a series of decreasing signals is transmitted with passage of time, as represented in pictorial form in FIG. 7. The difference in level between the successive pulses of different amplitude, may be adjusted with varying degrees of resolution, depending upon the number of bits used in counter 236 and register 224 and the sensitivity of the digital-to-analog converter 222 and the transmitter driver 220. For example, the level difference for successive pulses may be adjusted to be on the order of one decibel. The timer 238 may be adjusted to generate an output pulse with a repetition period sufficiently long to allow the circuitry to stabilize, taking into account the delays introduced in transmission. A recommended period is on the order of 100 milliseconds.

As described above, the transmitted signals will be decreased in magnitude with the passage of time. The first time that the magnitude of the signal received at the hub 105 fails to meet the threshold of threshold detector 132, no signal will be transmitted on optical link 112. Hence, the value of the output signal of filter 320 will drop to near zero and the comparator 322 will generate an output signal to reset the calibrate-enable flip-flop 230. This will inhibit timer 238 and register 224 will retain its last setting, one counter decrement below the level required to meet the hub threshold level. When all of the transmitters have been set to this level, the level of threshold 132 will be adjusted to the normal, lower, level as described above with respect to FIG. 5. This will allow pulses of the last magnitude transmitted by each of the transmitters to be detected by the threshold detector. It will be understood that the amount of level adjustments in the threshold detector 132 must be sufficient to assure that pulses of the last transmitted level will be detected, and that this level bears a direct relationship to the amount of change, one counter decrement, that is introduced in the calibration process between pulses of different levels. As stated earlier, the level adjustment in the threshold may be on the order of three decibels and the difference in successive pulse levels on the order of one decibel.

Alternatively, the calibration process can be accomplished without changing the level of threshold detector, by reducing the level of the calibration in the manner described and incrementing the counter 236 to the level of the next-to-last set of transmitted pulses and storing that value in register 224. To assure that the final level exceeds the threshold by a significant amount, it may be desirable to increment the counter twice. The incrementing of the counter and the transfer of the final value to register 224 can readily be done under control of processor 200 after the enable flip-flop 230 has been reset, by means of control leads (not shown) from the processor to counter.

Network Monitoring

Under normal conditions, when the system is not in the calibration mode, a token passing protocol is used to assure that all stations are given an opportunity to use the network in a prescribed sequence. Each interface processor is provided with the identity of the next station in the sequence and the interface processors transmit a control token to the next station in sequence when access to the network is no longer needed. The control token is transferred in the form of a packet, as outlined in FIG. 4, in which the data portion contains a unique code which is defined as the token. The hub processor 130 is equipped with a table in its memory containing the identity of all the host stations on the network and the sequence in which the tokens are to be passed. The program of the hub processor 130 includes a network monitoring sequence outlined in FIG. 10, whereby network error conditions due to malfunctions of the parts of the network or the connected stations may be detected.

The hub processor 130 monitors the flow of signals through the hub via conductor 133 (block 1001) and periodically checks to determine whether there is traffic on the network (block 1008). This test may simply be to determine whether the data flow represents a continual all-zero condition or a changing condition. If the traffic includes the control token, the hub processor records the source and destination information of the packet and resets two software timers referred to as timer A and timer B. This sequence is outlined in blocks 1003, 1005, and 1007 of FIG. 10. After this sequence, the program returns to monitoring packets flowing through the hub. The two program timers A and B are used for different purposes. Timer A is used to detect a loss of token, that is after a token has been transferred to a new host and the host does not take any action, it may be assumed that the token was not properly received or the intended host has failed to respond to the token. Timer B is used to detect the so-called "babbling node" condition. In this condition, one of the hosts will continue to transmit signals on the network for an inordinately long period of time rendering the network useless to other hosts connected to it. This condition may occur due to a malfunction in the host data handling station or in the network interface 103.

Figure 10:
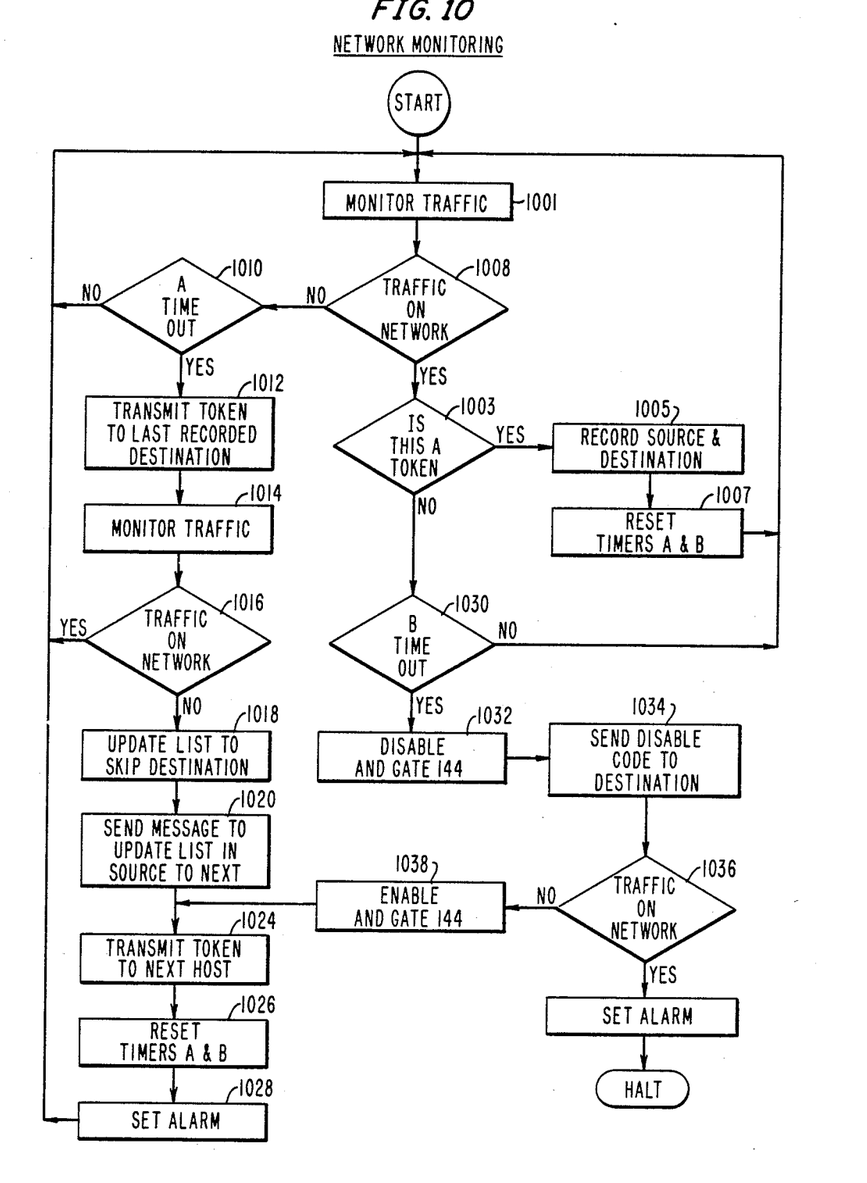
FIG. 10 is a flowchart representation of network monitoring functions performed by the hub processor of FIG. 1.

If during the monitoring of traffic through the hub, as indicated blocks 1001 and 1008 of FIG. 10, it is determined that there is no traffic on the network, it may be that the last token passed was lost. Timer A is consulted in block 1010 of FIG. 10 and if the timer has not timed out the program simply returns to monitoring traffic. Timer A may be set to time out after, for example, 100 milliseconds. If timer A has timed out, it is assumed that the token has been lost and processor 130 will transmit, block 1012, the token to the destination recorded, block 1005, for the last transmitted token. This is the identity of the host which was intended to have received the token but which has not responded. Thereafter, the traffic on the network is monitored, in block 1014, and a test is made once again, in block 1016, to determine whether any traffic exists on the network. If so, then the token is presumed to have been properly received and the program returns to monitoring traffic as indicated in block 1001.

If after retransmission of the token to the last recorded destination it is determined in block 1016 that there is no traffic on the network, it is assumed that the host to which the token was passed cannot respond. In that case, the list in memory of hub processor 130 is updated, block 1018, to skip the malfunctioning host, which is identified by the destination recorded in memory, as indicated in block 1005. Furthermore, a message is sent to the host, block 1020, identified by the source recorded during execution of the step of block 1005 to prevent this host from passing its token to the disabled host in the future. This update enters the identity of the host following the disabled host in the token passing sequence. Accordingly, this update causes the unresponsive host to be dropped from the token passing sequence. Thereafter, hub processor 130 transmits the control token, block 1024, to the next host in sequence after the disabled host, to continue normal network actions. Timers A and B are both reset, block 1026, and an alarm may be set, block 1028, in a known manner to alert maintenance personnel.

Blocks 1003 and 1008 represent tests on the traffic to determine whether traffic exists and whether a token has been passed. If there is traffic on the network and no token has been passed, timer B is checked as indicated in block 1030 to determine if time out has occurred. If not, the traffic monitoring will continue. If timer B has timed out, it will indicate that the node has controlled the network for an inordinate amount of time. Timer B might be set to time out, for example, after one minute or some other suitable time period. If timer B has timed out, the signal transfer path through the hub will be interrupted by disabling AND gate 144, as indicated in block 1032. Thereafter, as indicated by block 1034, a disable code is sent to the host which is identified by the destination recorded during execution of block 1005. Thereafter, block 1036, a test is made to determine whether there continues to be traffic on the network. If so, it indicates that the node from which the traffic originates has not been properly disabled. In that case, an alarm is set, block 1040, in a known manner to alert maintenance personnel, and the hub processor 130 is halted. If it appears during the test of block 1036 that there is no further traffic, as monitored via conductor 133 which is connected in the signal transfer path before the AND gate, it is assumed that the malfunctioning node has been properly disabled. Thereafter, AND gate 144 is again enabled, as indicated in block 1038 and the program executes blocks 1024, 1026 and 1028 to pass the control token to the next host and continues to monitor traffic through the hub.

The disable code transmitted to a host, as indicated in block 1034 is transmitted from hub processor 130 via conductor 131 and OR gate 133 using the normal signal path. In each interface receive circuit 310 the disable code is applied through the serial-to-parallel converter 318 to a matcher circuit 330 which compares the received code with the contents of a disable register 332 containing the disable code shown in FIG. 3. To avoid erroneous disable activity, a counter 334 has been provided. The processor 130 will send the disable code several times in sequence and the counter 334 will be incremented each time the code is detected by matcher 330. When a predetermined count is reached, a disable flip-flop 336 is set. The output of flip-flop 336 on conductor 337 is used to clear register 224. The all-zeros contents of register 224 will cause the transmitter driver 220 to be inhibited, preventing the further transmission of pulses on the network.

As shown in FIG. 2, a matcher circuit 242 is connected to the output of register 224 and to a threshold limit register 244. The threshold limit register may be set, for example, to the all-zeros condition causing the matcher 242 to generate an output signal when register 224 is cleared, thereby alerting the processor 200 that its transmitter driver 220 has been disabled. The processor will generate an alarm message in a known manner indicating a malfunction, but the network will be available for use by other hosts, in the meantime. The disable flip-flop 336 and the counter 334 may be reset from an external source, under control of a system reset.

Figure 9:
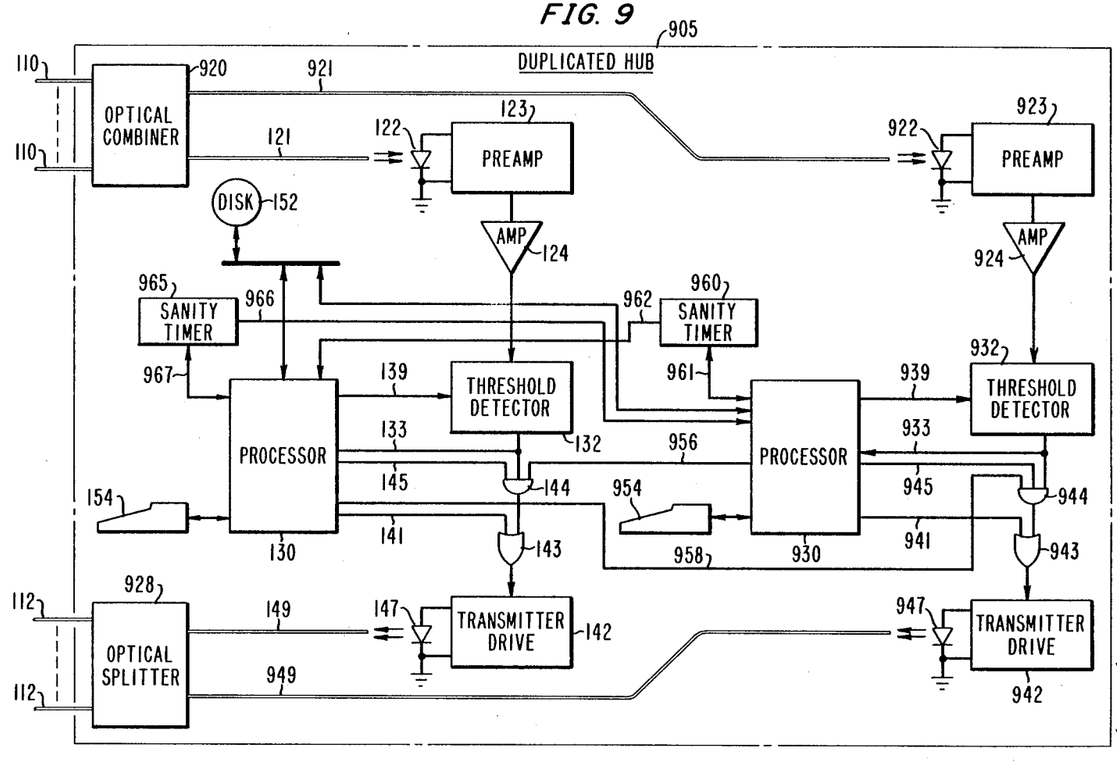
FIG. 9 is a block diagram representation of a hub having duplicated components.

FIG. 9 represents an alternate embodiment of the network hub of this invention in which hub components are duplicated for greater reliability. The duplicated hub 905 is connected in the network in the same manner as hub 105 shown in FIG. 1. That is, the hub receives optical signals from each of the network interfaces on optical links 110 and transmits optical signals to the network interfaces 103 via links 112. Optical combiner 920 has a plurality of optical fiber inputs, links, 110, and two optical fiber output conductors 121 and 921. In an analogous fashion, the optical splitter 928 has a plurality of optical fiber outputs, links 112 and two optical fiber input conductors 149 and 949. Optical combiners and optical splitters are commercially available and readily adapted to provide dual input or dual output as used in this arrangement. As described earlier with respect to FIG. 1, optical signals received at the hub are transferred via optical conductor 121 to a commercially available optical detector which transforms the optical signal into an electrical signal. The electrical signal is amplified by preamp 123 and amplifier 124 and is transferred through threshold detector 132, AND gate 144 and OR 143 to the transmitter driver 142. The electrical signal is transformed into an optical signal by optical source 147 and transmitted to optical splitter 928. In a similar manner, optical signals received at optical combiner 920 are transmitted via optical fiber conductor 921 to optical detector 922 which transforms them into electrical signals. These signals are amplified by preamp 923 and amplifier 924 and transferred through threshold detector 932, AND gate 944 and OR gate 943 to transmitter driver 942. The signals are transformed to optical signals by optical source 947 and transmitted to the optical splitter 928 via optical fiber conductor 949. Thus, two independent signal transfer paths are provided through the hub.

Each signal transfer path has a processor associated with it to perform monitoring and control functions. Processor 130 is associated with the signal transfer path coupled between optical fiber conductors 121 and 149. The other processor 930 is associated with the signal transfer path coupled to optical fiber conductors 921 and 949. Either may be designated as the active or the standby processor. Processors 130 and 930 are provided with input/output terminals 154 and 954, respectively, for independent control. Alternatively, a single terminal may be connected to both processors. Both processors are connected to disc store 152 to provide access to a common system data base. Furthermore, processor 930 has associated with it a sanity timer 960 and processor 130 has associated with it a sanity timer 965. Sanity timers are well known in the art and are commonly used to provide a measure of continued execution of programs by the associated processor. The processor's programs are arranged such that the sanity timer will be reset each time the program reaches a certain point. If the reset does not occur, due to a malfunction, the sanity timer will reach a preset value at which an output signal is produced by the timer, independent of the operation of the processor. In this illustrative embodiment, the sanity timers 960 and 965 are connected to provide an output signal to both processors in the event that the predetermined value is reached.

If the processor 130 is designated as the active processor, it will perform the normal monitoring and control functions. As part of this routine it is anticipated that the sanity timer 965 will be reset by processor 130 by means of a signal on conductor 967 each timer the processor program passes through a certain designated point. If due to some malfunction, the program fails to reach that point for an extended period of time, the sanity timer 965 will exceed its preset level and apply an output signal to processor 130 to halt that processor and place it in the standby state, and apply an output signal to processor 930 to place processor 930 in the active state and cause it to begin executing its programs. In anticipation of the receipt of such a signal, the processor 930 has been initialized and placed in a position to begin executing its software in response to a signal from sanity timer 965. In a similar manner, sanity timer 960 is reset under control of the programs of processor 930 via conductor 961. In the event that sanity timer 960 exceeds its preset value, it will apply an output signal to processor 930 via conductor 961 and to processor 130 via conductor 962, causing processor 930 to enter the halt state and processor 130 to initiate executing programs.

When processor 130 is the active processor, it will enable AND gate 144 via conductor 145 and disable AND gate 944 via conductor 958; when it is in the standby state, processor 130 will inhibit AND gate 144 via conductor 145 and provide an enable signal to AND gate 944 via conductor 958. Similarly, processor 930 will enable AND gate 944 and inhibit AND gate 144 when it is in the active state, and enable AND gate 144 and inhibit AND gate 944 when it is in the standby state.

It will be understood that numerous changes and modifications may be made to this illustrative embodiment by persons skilled in the art. For example, the hub processor may be used to monitor occupancy of the network by each of the stations or total occupancy to allow system personnel to determine optimum use of the network. It will also be apparent that other functions, such as more or less control in the calibration process could be allocated to the interface processor 200. These and other changes and modifications can be made without departing from the spirit and scope of this invention and it is intended that all such changes and modifications be covered by the following claims.

What is claimed is:

1. A star configuration optical network for interconnecting a plurality of otherwise unconnected data handling stations comprising:
   a plurality of network interface means each adapted to be connected to a data handling station;
   a network hub for transferring a serial data stream from any one of said interface means to any other and
   transmission means comprising optical fibers connecting said hub to each of said interface means;
   said hub comprising hub receiver means comprising an optical combiner for additively combining the optical signals received from said transmission means for receiving a serial data stream from any of said interface means and hub transmitting means for transmitting signals to any of said interface means, data transfer means coupled to said hub receiver means and hub transmitter means for generating a combined data stream from the output of said optical combiner and for transferring said combined data stream from said hub receiver means to said hub transmitter means, and controller means coupled to said data transfer means for monitoring the data contents of said combined data stream as it is transferred by said data transfer means and responsive to said monitored data for selectively inhibiting the transfer of data by said data transfer means;
   wherein said hub transmitting means comprises an optical splitter, and said data transfer means comprises first and second signal transfer paths coupled to said optical combiner and said optical splitter, said first and said second signal transfer path each comprising means for transforming optical signals to electrical signals, means for amplifying electrical signals, gate means for inhibiting the transfer of signals in the associated transfer path, and means for converting electrical signals to optical signals; and wherein said controller means comprises a first processor connected to said first signal transfer path for monitoring signals in said first signal transfer path and for controlling said gate means of said first signal transfer measn to inhibit the transfer of signals in said first path and a second processor connected to said second signal transfer path for monitoring signals in said second signal transfer path and for controlling said gate means of said second signal transfer path to inhibit the transfer of signals in said second path.

2. A network arrangement for interconnecting a plurality of data handling stations comprising:
   a plurality of network interface means, each adapted to be connected to a data handling station;
   a network hub; and
   transmission means connecting said hub to each of said interface means;
   said hub comprising hub receiver means for receiving signals from said interface means and hub transmitter means for transmitting signals received by said hub receiver means to said interface means, signal transfer means coupled to said hub receiver means and said hub transmitter means for transferring signals from said hub receiver means to said hub transmitter means, and controller means for monitoring signals received from said interface means and for selectively inhibiting the transmission of signals to said interface means;
   wherein said transmission means comprises optical fiber conductors, said hub receiver means comprises an optical combiner, said hub transmitting means comprises an optical splitter, and said signal transfer means comprises first and second signal transfer paths coupled to said optical combiner and said optical splitter, said first and said second signal transfer path each comprising means for transforming optical signals to electrical signals, means for amplifying electrical signals, gate means for inhibiting the transfer of signals in the aassociated transfer path, and means for converting electrical signals to optical signals; and wherein said controller means comprises a first processor connected to said first signal transfer path for monitoring signals in said first signal transfer path and for controlling said gate means of said first signal transfer means to inhibit the transfer of signals in said first path and a second processor connected to said second signal transfer path for monitoring signals in said second signal transfer path and for controlling said gate means of said second signal transfer path to inhibit the transfer of signals in said second path; and wherein said hub further comprises a first sanity timer controlled by said first processor and connected to said first and said second processor for halting said first processor and for starting said second processor when said first sanity timer means reaches a predetermined setting, and a second sanity timer controlled by said second processor and connected to said first and said second processors for halting said second processor and for starting said first processor when said second sanity timer reaches a predetermined setting.

3. A star configuration optical network for interconnecting a plurality of otherwise unconnected data handling stations comprising:

a plurality of network interface means each adapted to be connected to a data handling station;

a network hub for transferring a serial data stream from any one of said interface means to any other; and transmission means comprising optical fibers connecting said hub to each of said interface means;

said hub comprising hub receiver means comprising an optical combiner for additively combining the optical signals received from said transmission means for receiving a serial data stream from any of said interface means and hub transmitting means for transmitting signals to any of said interface means, data transfer means coupled to said hub receiver means and hub transmitter means for generating a combined data stream from the output of said optical combiner and for transferring said combined data stream from said hub receiver means to said hub transmitter means, and controller means coupled to said data transfer means for monitoring the data contents of said combined data stream as it is transferred by said data transfer means and responsive to said monitored data for selectively inhibiting the transfer of data by said data transfer means;

wherein said controller means is responsive to a network error condition detected in said monitored data stream to inhibit said transmission of signals received by said receiver means and to selectively transmit control signals via said transmission means to selected ones of said plurality of interface means.

4. The network arrangement in accordance with claim 3 wherein said controller means detects continual transmission of data for more than a predetermined period of time and is responsive to such detected condition to inhibit said transmission of signals received by said receiver means and to transmit said control signals via said transmission means to one of said interface means.

5. The network arrangement in accordance with claim 3 wherein said data means comprises gate means for selectively transferring to said transmitter means signals received at said receiver means or signals generated by said controller means.

6. A network arrangement in accordance with claim 3, wherein each of said interface means comprises an interface transmitter means connected to said transmission means for transmitting signals to said hub, interface receiver means connected to said transmission means for receiving signals from said hub, and means responsive to said control signals to inhibit the transmission of signals by said interface transmitter means.

7. A network arrangement for interconnecting a plurality of data handling stations comprising:

a plurality of network interface means, each adapted to be connected to a data handling station;

a network hub; and transmission means connecting said hub to each of said interface means;

each of said plurality of interface means comprising an interface transmitter means connected to said transmission means for transmitting signals to said hub, interface receiver means connected to said transmission means for receiving signals from said hub, and means responsive to said control signals to inhibit the transmission of signals by said interface transmitter means comprising means for storing a disable code, means for comparing said disable code with received signals and for generating match output signals when received signals match said disable code, and inhibit circuit means responsive to said match output signal to inhibit transmission of signals by said interface transmitter means;

said hub comprising hub receiver means for receiving signals from said interface means and hub transmitting means for transmitting signals received by said hub receiver means to said interface means, signal transfer means coupled to said hub receiver means and said hub transmitter means for transferring signals from said hub receiver means to said hub transmitter means, and controller means for monitoring signals received from said interface means, for selectively inhibiting the transmission of signals to said interface means, and for monitoring the network for error conditions, and responsive to a detected error condition to inhibit said transmission of signals received by said receiver means and to selectively transmit control signals via said transmission means to said interface means.

8. A network arrangement in accordance with claim 7 wherein said inhibit circuit means generates an inhibit signal to inhibit transmission by said interface transmitter means and comprises counter means for counting match output signals and for generating said inhibit signal after a predetermined count has been reached.

9. A network arrangement in accordance with claim 7, wherein said transmitter means comprises a transmitting device responsive to a digital control word to control the level of its output signal and control register means for storing said control word, and said inhibit signal resets said control register to a state corresponding to a zero level output signal at said transmitter device.

10. A network arrangment for interconnecting a plurality of data handling stations comprising:

a plurality of network interface means, each adapted to be connected to a data handling station;

a network hub for transmitting signals received from said interface means comprising adjustable threshold detector means for inhibiting the transfer through said hub of the signals having power levels lower than a predetermined level; and a transmission medium connecting all said interface means to said hub;

each of said interface means comprising transmitter means connected to said transmission medium, calibration control means for controlling said transmitter means to transmit a sequence of calibration signals at differing power levels, receiver means connected to said transmission medium, and means connected to said receiver means and responsive to signals received from said hub fur controlling said calibration controls means.

11. The arrangement in accordance with claim 10 wherein said threshold detector means is responsive to threshold control signals to vary the threshold for the detection of signals and wherein said hub comprises control means connected to said threshold detector means for generating threshold control signals to adjust the threshold to a higher level prior to calibration and to a comparatively lower level after calibration.

12. The network arrangement in accordance with claim 10 wherein said calibration means comprises means for periodically reducing the output level of said transmitter means.

13. The network arrangement in accordance with claim 10 wherein said means for controlling said calibration control means comprises means for disabling said calibration control means when the level of signals received from said hub are below a predetermined threshold.

14. The arrangement in accordance with claim 10 wherein said transmission medium comprises a transmit optical fiber conductor connected between each of said interface means and said hub, and a receive optical fiber conductor connected between each of said interface means and said hub.

15. The method of calibrating transmitting devices in a star configuration optical network interconnecting a plurality of data handling stations, said network comprising a hub, comprising the steps of:
(a) adjusting a threshold detector in said hub to a predetermined level,
(b) adjusting the transmitting device of one of the stations connected to the network to transmit a signal of sufficient amplitude to exceed said predetermined level,
(c) detecting signals exceeding a predetermined level in the network by said detector,
(d) adjusting the transmitting device of said one station to transmit another signal of a lower amplitude than the last previously transmitted signal,
(e) repeating steps (c) and (d) until no signal exceeding said predetermined level is detected,
(f) adjusting said threshold detector to a new level which is an increment lower than said predetermined level, and
(g) inhibiting the transfer through said hub of all signals below said new level.

16. The method in accordance with claim 15 and further comprising the steps of repeating steps (b) through (e) with respect of each of the data handling stations connected to the network prior to execution of step (f).

17. The method in accordance with claim 15 including transmitting a calibration signal to all stations to establish a common signal receiving level at all stations, prior to executing step (b).

18. A network hub element for a star configuration optical network for transferring data among a plurality of data handling stations each connected to said hub, said hub comprising:
receiver means comprising an optical combiner for additively combining the optical signals received from said transmission means for receiving serial data streams from said stations;
transmitter means for transmitting signals to said stations;
data transfer means coupled to said receiver means and said transmitter means for generating a combined data stream from the output of said optical combiner and for transferring said combined data stream from said receiver means to said transmitter means; and
controller means connected to said data transfer means and said transmitter means for monitoring the data contents of said combined data stream as it is transferred by said data transfer means from said receiver means to said transmitter means and responsive to said monitored data for selectively generating signals at said transmitter means for transmission to selected ones of said data handling stations.

19. A network hub element in accordance with claim 18 wherein said controller means generates station transmission disable and enable signals.

20. A network hub element in accordance with claim 18 wherein said controller means transmits data signals.

21. A network hub element in accordance with claim 18 wherein said transmitter means comprises an optical splitter, and said data transfer means comprises first and second signal transfer paths; said first and said second signal transfer path each comprising means coupled to said optical combiner for transforming optical signals to electrical signals, means for amplifying electrical signals, gate means for inhibiting the transfer of signals in the associated transfer path, and means coupled to said optical splitter for converting electrical signals to optical signals; and wherein said controller means comprises a first processor connected to said first signal transfer path for monitoring signals in said first signal transfer path and for controlling said gate means of said first signal transfer path to inhibit the transfer of signals in said first path and a second processor connected to said second signal transfer path for monitoring signals in said second signal transfer path and for controlling said gate means of said second signal transfer path to inhibit the transfer of signals in said second path.

22. A network hub element in accordance with claim 18 further comprising input terminal means connected to said controller means, said controller means being responsive to information entered at said terminal means to transmit corresponding data or control signals to said transmitter means.

23. A network hub element in accordance with claim 18 and further comprising mass storage means connected to said controller means, said controller means being responsive to message received at said receiver means to retrieve data from and store data in said mass storage means.

24. A network hub element in accordance with claim 23 wherein said controller means is further responsive to said messages to transmit data stored in said mass storage means to said transmitter means.

25. A network hub element for a network for transferring data among a plurality of data handling stations each connected to said hub, said hub comprising:
receiver means for receiving signals from said stations comprising an optical combiner;
transmitter means for transmitting signals to said stations comprising an optical splitter;

signal transfer means coupled to said receiver means and said transmitter means for transferring signals from said receiver means to said transmitter means comprising first and second signal transfer paths, said first and said second signal transfer path each comprising means coupled to said optial combiner for transforming optical signals to electrical signals, means for amplifying electrical signals, gate means for inhibiting the transfer of signals in the associated transfer path, and means coupled to said optical splitter for converting electrical signals to optical signals.

controller means connected to said signal transfer means and said transmitter means for monitoring signal transfer from said receiver means to said transmitter means and for selectively generating signals at said transmitter means for transmission to said data handling stations, said controller means comprising a first processor connected to said first signal transfer path for monitoring signals in said first signal transfer path and for controlling said gate means of said first signal transfer path to inhibit the transfer of signals in said first path, a second processor connected to said second signal transfer path for monitoring signals in said second signal transfer path and for controlling said gate means of said second signal transfer path to inhibit the transfer of signals in said second path, a first sanity timer controlled by said first processor and connected to said first and said second processors for halting said first processor and for starting said second processor when said first sanity timer means reaches a predetermined setting, and a second sanity timer controlled by said second processor and connected to said first and said second processors for halting said second processor and for starting said first processor when said second sanity timer reaches a predetermined setting.

26. A network hub element for a star configuration network for transferring data among a plurality of data handling stations each connected to said hub, said hub comprising:

receiver means for receiving a serial data stream from said stations;

transmitter means for transmitting signals to said stations;

data transfer means coupled to said receiver means and said transmitter means for transferring a serial data stream from said receiver means to said transmitter means; and controller means connected to said data transfer means and said transmitter means for monitoring the data contents of a serial data stream as it is transferred by said data transfer means from said receiver means to said transmitter means and responsive to said monitored data for selectively generating signals at said transmitter means for transmission to said data handling stations;

wherein said data transfer means includes means responsive to control signals for selectively inhibiting the transfer of signals from said receiver means to said transmitter means and said controller means selectively generates said inhibit control signals, whereby said transmitter means can be used to transmit control signals without interference from signals received at said receiver means.

27. A hub element for a star configuration optical network for transferring data among a plurality of data handling stations connected to the hub, said hub comprising:

receiver means comprising an optical combiner for additively combining the optical signals received from said transmission means for connection to said stations for receiving serial data streams from said stations;

transmitter means for connection to said stations and for transmitting a data stream to said stations;

data transfer means coupled to said receiver means and said transmitter means for generating a combined data stream from the output of said optical combiner and for transferring said combined data stream from said receiver means to said transmitter means; and controller means for monitoring the data contents of said combined data stream received by said receiver means for network error conditions, and responsive to a detected error condition to inhibit the transmission by said transmitter means of data received by said receiver means and to selectively transmit data handling station control signals to selected ones of said data handling stations.

28. A hub element in accordance with claim 27, wherein said controller means monitors said data contents of said combined data stream received by said receiver means to detect data signals transmitted from one of said stations to another of said stations and detects an error condition in the absence of receipt of said data signals from said one of said stations for a predetermined period of time.

29. A hub element for a network for transferring data among a plurality of data handling stations connected to the hub, said hub comprising:

receiver means for connection to said stations and for receiving signals from said stations;

transmitter means for connection to said stations and for transmitting signals to said stations;

signal transfer means coupled to said receiver means and said transmitter means for transferring signals from said receiver means to said transmitter means;

controller means for monitoring signals received by said receiver means for network error conditions, and responsive to a detected error condition to inhibit the transmission by said transmitter means of signals received by said receiver means and to selectively transmit data handling station conrol signals, for monitoring signals transmitted from one of said stations to another of said stations and detecting an error conditions in the absence of receipt of signals for a predetermined period of time, and for recognizing control tokens, recording address information accompanying control tokens identifying an intended receiving station, and responsive in the absence of the receipt of one of said control tokens for a predetermined period of time to transmit via said transmitter means a station disable code for the station most recently identified as the token receiving station.

30. A network hub element in accordance with claim 29 wherein said controller means records the sequence in which data handling stations are to receive control tokens and is further responsive in the absence of receipt of one of said control tokens for a predetermined period of time to transmit a control token via said transmitter means accompanied by address information identifying the next data handling station in said sequence.

31. A star configuration optical network for interconnecting a plurality of otherwise unconnected data handling stations comprising:
- a plurality of network interface means each adapted to be connected to a data handling station;
- a network hub for transferring a serial data stream from any one of said interface means to any other; and
- transmission means comprising optical fibers connecting said hub to each of said interface means;
- said hub comprising hub receiver means comprising an optical combiner for additively combining the optical signals received from said transmission means for receiving a serial data stream from any of said interface means and hub transmitting means for transmitting signals to any of said interface means, data transfer means coupled to said hub receiver means and hub transmitter means for generating a combined data stream from the output of said optical combiner and for transferring said combined data stream from said hub receiver means to said hub transmitter means, and controller means including stored program instructions coupled to said data transfer means operative under control of said program instructions for monitoring the data contents of said combined data stream as it is transferred by said data transfer means and responsive to said monitored data and said program instructions for selectively inhibiting the transfer of data by said data transfer means.

* * * * *

UNITED STATES PATENT AND TRADEMARK OFFICE
CERTIFICATE OF CORRECTION

PATENT NO. : 4,731,880

DATED : March 15, 1988

INVENTOR(S) : Cyrus F. Ault, Clinton D. Gibler

It is certified that error appears in the above-identified patent and that said Letters Patent is hereby corrected as shown below:

Column 13, line 58, after "other", insert a semicolon.

Column 14, line 26, delete "measn" and substitute --means--.

Column 14, line 61, delete "aassociated" and substitute --associated--.

Column 17, line 5, delete "fur" and substitute --for--.

Column 17, line 6, delete "controls" and substitute --control--.

Column 17, line 59, delete "15" and substitute --16--.

Column 18, line 55, delete "message" and substitute --messages--.

Column 19, line 12, delete the period and substitute a semicolon.

Column 20, line 48, delete "conrol" and substitute --control--.

Signed and Sealed this

Twentieth Day of September, 1988

Attest:

DONALD J. QUIGG

*Attesting Officer*  *Commissioner of Patents and Trademarks*